United States Patent
Chabanne et al.

(10) Patent No.: US 8,638,940 B2
(45) Date of Patent: Jan. 28, 2014

(54) CONTROL OF AN ENTITY TO BE CONTROLLED BY A CONTROL ENTITY

(75) Inventors: Hervé Chabanne, Paris (FR); Julien Bringer, Paris (FR); Thomas Icart, Paris (FR)

(73) Assignee: Morpho, Paris (FR)

( * ) Notice: Subject to any disclaimer, the term of this patent is extended or adjusted under 35 U.S.C. 154(b) by 78 days.

(21) Appl. No.: 12/747,768

(22) PCT Filed: Dec. 10, 2008

(86) PCT No.: PCT/FR2008/052271
§ 371 (c)(1),
(2), (4) Date: Jun. 11, 2010

(87) PCT Pub. No.: WO2009/080992
PCT Pub. Date: Jul. 2, 2009

(65) Prior Publication Data
US 2010/0284538 A1    Nov. 11, 2010

(30) Foreign Application Priority Data
Dec. 12, 2007 (FR) ..................................... 07 08662

(51) Int. Cl.
*H04L 9/00* (2006.01)
(52) U.S. Cl.
USPC .......................... 380/277; 380/278; 380/283
(58) Field of Classification Search
None
See application file for complete search history.

(56) References Cited

U.S. PATENT DOCUMENTS

| | | | | |
|---|---|---|---|---|
| 5,136,642 | A * | 8/1992 | Kawamura et al. | 380/282 |
| 7,382,875 | B2 * | 6/2008 | Girault et al. | 380/28 |
| 2010/0098253 | A1 * | 4/2010 | Delerablee | 380/259 |

FOREIGN PATENT DOCUMENTS

WO    WO-03/055134 A1    7/2003

OTHER PUBLICATIONS

International Search Report and Written Opinion from related International Application No. PCT/FR2008/052271; report dated Jun. 17, 2009 (12 pages).
Bringer, et al.; "*Identification and Privacy: Zero-Knowledge is not Enough*"; website; May 20, 2008; pp. 1-46; http://eprint.iacr.org/2008/229.

(Continued)

*Primary Examiner* — Jeffrey Pwu
*Assistant Examiner* — Carlos Amorin
(74) *Attorney, Agent, or Firm* — Miller, Matthias & Hull LLP

(57) ABSTRACT

A control entity communicates with an entity to be controlled so as to effect a control, a secret key being associated with the control entity. These entities share public parameters, a second public parameter being a combination of a first public parameter of the said plurality with the secret key. At the level of the entity to be controlled, a random value is generated, a first message is transmitted to the control entity, this first message comprising at least one value obtained by combining the first public parameter with the random value; and a second message is transmitted to the control entity, this second message comprising at least one value obtained by combining the first random value, a secret key of the entity to be controlled and a value received from the control entity. One of the values included in the first or the second message is based on the second public parameter.

18 Claims, 1 Drawing Sheet

(56) References Cited

OTHER PUBLICATIONS

Vaudenay, et al., "About Machine-Readable Travel Documents", Journal of Physics: Conference Series, Jul. 2007, pp. 1-9, vol. 77, No. 1, Lausanne, Switzerland.

Schnorr, "Efficient Signature Generation by Smart Cards", Journal of Cryptology, Mar. 1991, pp. 1-22.

Girault, et al., "On the Fly Authentication and Signature Schemes Based on the Groups of Unknown Order", Journal of Cryptology, 2006, pp. 463-487.

Okamoto, "Provably Secure and Practical Identification Schemes and Corresponding Signature Schemes", pp. 31-53, 1992.

Fiat, et al., "How to Prove Yourself: Practical Solutions to Identification and Signature Problems", from proceedings of Crypto, 1986.

Ong, et al., "Fast Signature Generation with a Fiat Shamir-Like Scheme", Eurocrypt, 1990.

"A Modification of the Fiat Shamir Scheme", from proceedings of Crypto 1988.

Guillou, et al., "A Paradoxical Identity-Based Signature Scheme Resulting from Zero-Knowledge Minimizing Both Transmission and Memory", from proceedings of Crypto, 1988.

\* cited by examiner

CONTROL OF AN ENTITY TO BE CONTROLLED BY A CONTROL ENTITY

CROSS-REFERENCE TO RELATED APPLICATIONS

This application is a U.S. national stage filing under 35 USC §371 of International Patent Application No. PCT/FR2008/052271 filed on Dec. 10, 2008 which claims priority under the Paris Convention to the French Patent Application No. 07 08662, filed on Dec. 12, 2007.

FIELD OF THE DISCLOSURE

The present invention relates to a check of an entity to be checked, this entity possibly being an electronic chip entity, and more particularly an electronic chip entity operating contactlessly.

BACKGROUND OF THE DISCLOSURE

In the present context, the term 'check' is understood to mean an operation such as authenticating the electronic chip or identifying the electronic chip. Generally, a check of an electronic chip corresponds to any operation which allows a checking entity to verify that the electronic chip is able to prove the knowledge of a secret.

Such a check can be made in relation to an electronic passport or else to an RFID ('Radio Frequency IDentification') type tag.

Some of these checks are based on asymmetric cryptographic checking schemes using a public key and private key pair.

Known in particular is the identification system described in the document 'About machine-readable travel documents' by Vaudenay, S.; Vuagnoux, M. published in the Journal of Physics: Conference Series, Volume 77, Issue 1, pp. 012006 (2007), in July 2007, for which it is proposed to use protocols of 'zero-knowledge' type, that is to say which do not reveal any information about the users secret and thus a priori do not allow a potential attacker to follow the user.

However, the use of such protocols may reveal information about the public key associated with the user to this potential attacker even if the latter has no prior information in this regard. Thus, an attacker may obtain information about the user of such an electronic chip by listening to the exchanges of information between this electronic chip and a checking entity. Access to some of this information may allow an ill-intentioned person to undermine the private life of the user of such an electronic chip, for example by allowing him to retrace the movements of this electronic chip.

FIG. 1 illustrates an embodiment of the prior art. More precisely, in the document cited above, provision is made for the checking system to comprise an entity to be checked 12 on one side and a checking entity 11 on the other.

A public parameter of this system is denoted g, and corresponds to the generator of the set of values in which the calculations are performed. The entity to be checked 12 is furnished with a public key I and a secret key s. The public key I satisfies the following equation:

$$I = g^s$$

The checking entity 11 generates a value $c_v$ in a random manner.

The checking entity 11 transmits a value $\gamma$ arising from the random value $c_v$ to the entity to be checked 12.

The entity to be checked 12 generates a value r, and a value $c_p$ in a random manner.

Next, it transmits the following values to the checking entity 11:
x, which corresponds to $g^r$; and
$c_p$.

The checking entity 11 then transmits the following values:
$\delta$ and $c_v$,
$\delta$ and $\gamma$ being generated at the same time on the basis of the value $c_v$.

The entity to be checked checks the consistency of the values $\delta$, $\gamma$ and $c_v$.

It thereafter transmits a value y satisfying:

$$y = r + cs,$$

where $c = c_p + c_v$.

On the other side, the checking entity 11 checks that the following equation is satisfied:

$$g^y = xI^c$$

Thus, by listening to the exchanges between the checking entity 11 and the entity to be checked 12, it is possible to obtain the value of $I^c$ and of c according to the following equations:

$$I^c = g^y/x; \text{ and}$$

$$c = c_v + c_p$$

Next, by listening again, it is possible to obtain a value $I^{c'}$ and c'.

Thereafter, if the following equation is satisfied, it is possible to deduce therefrom that the two listenings correspond to the same entity to be checked 12, and therefore reveals information relating to this entity to be checked:

$$I^{cc'} = I^{c'c}$$

Thus, the use of protocols such as Schnorr, Fiat-Shamir or GPS (for Girault, Poupard and Stern) makes it possible to obtain information that one would, however, wish to keep secret.

Document WO 03/055134 describes a procedure aimed at checking, by a checking entity, an entity to be checked with which a secret key and a public key are associated. In this context, it is impossible to keep secret all information related to the entity to be checked.

The present invention is aimed at improving the situation.

SUMMARY OF THE DISCLOSURE

A first aspect of the present invention proposes a method of checking an entity to be checked by a checking entity,
a secret key being associated with the checking entity;
said entity to be checked and said checking entity sharing a plurality of public parameters, a second public parameter of said plurality being a combination of a first public parameter of said plurality with the secret key of the checking entity;
said method comprising the following steps at the level of the entity to be checked:
/a/ generating at least one random value;
/b/ transmitting a first message to the checking entity, said first message comprising at least one combined value obtained by combining the first public parameter with the random value; and
/c/ transmitting a second message to the checking entity, said second message comprising at least one combined value obtained by combining the random value, a secret key of the entity to be checked and a value received from the checking entity;

in which one of the values included in the first or the second message is based on the second public parameter.

Here, a secret key is advantageously assigned to the checking entity which is used for obtaining one of the public parameters shared between the checking entity and the entity to be checked. By virtue of these arrangements, it is possible to keep secret all information related to the entity to be checked even if the exchanges between the checking entity and the entity to be checked are listened to. Indeed, without the knowledge of the secret key of the checking entity, no information about the entity to be checked can be revealed on the basis of the exchanges performed between these two entities according to an embodiment of the present invention.

The present invention can advantageously be implemented in numerous fields. The fields of application of chip cards, such as electronic passports, RFID tags, and more generally the field of electronic transactions may be cited by way of nonlimiting example.

Provision may be made for first and second random values to be generated in step /a/ and for the value based on the second public parameter to be furthermore based on the second random value and to be transmitted in the first message. In this case, the value arising from a combination with the second public parameter is transmitted to the checking entity at the start of the exchange of messages.

Such an embodiment can advantageously be implemented in the context of a Schnorr type protocol, such as defined in the document by Schnorr 'Efficient signature generation by smart cards' from Journal of Cryptology 1991.

The first combined value can be obtained by calculating the first public parameter to the power of the first random value and the second combined value can be obtained by calculating the second public parameter to the power of the second random value. The third combined value can be obtained by summing the following values:
 the first random value,
 the second random value, and
 the product of the secret key of the entity to be checked with the value received from the checking entity.

By proceeding thus, benefit is advantageously derived from the secret key of the checking entity in the combined values sent from the entity to be checked to the checking entity. Indeed, on the basis of these values it is not possible to effect an arbitrary check of the identity of the entity to be checked without possessing the secret key of the checking entity.

It is then possible to decide that the entity to be checked is checked on the basis of the following equation:

$$J=((g^v)^y x^{-v} z^{-1})^{1/vc}$$

where J is the public key of the entity to be checked or a value in a database accessible from the checking entity;
where g is the first public parameter;
where $g^v$ is the second public parameter;
where x is the combined value transmitted in the first message;
where y is the combined value transmitted in the second message;
where z is the value based on the second public parameter;
where c is the value received from the checking entity;
where v is the secret key of the checking entity.

Thus, on the basis of the above equation, it is possible either to authenticate the entity to be checked in the case where the checking entity knows the public key I of the entity to be checked, or to identify this entity to be checked in the case where the checking entity has access to a database containing at least this public key I.

Provision may also be made to bound the random values, the secret key of the entity to be checked, as well as the value received from the checking entity between 0 and respective defined values. In this case, the method according to an embodiment of the present invention readily finds an application advantageously in the context of a protocol of GPS type, such as defined for example in the document 'On the fly authentification and signature schemes based on groups of unknown order' by Girault, Poupard, Stern from the Journal of Cryptology 2006.

Provision may be made for the first and second random values to lie between 0 and A−1; the value received from the checking entity to lie between 0 and B−1; and the secret key of the entity to be checked to lie between 0 and S−1; where A, B and S are public parameters. Under these conditions the entity to be checked can be checked furthermore on the basis of the following inequality:

$$0 \le y \le 2(A-1)+(B-1)(S-1)$$

Thus, it is easy to base oneself on a checking method according to an embodiment of the present invention so as to deduce therefrom a method of authentication or identification which preserves the confidentiality of the entity to be checked.

In an embodiment of the present invention, it is decided that the entity to be checked is checked on the basis of the following equation:

$$J^{vc} = \frac{(g_1^v)^{y_1}(g_2^v)^{y_2}}{x^v z}$$

where J is the public key of the entity to be checked or a value in a database accessible from the checking entity;
where $g_1$ and $g_2$ are two first public parameters;
where $g_1^v$ and $g_2^v$ are two second public parameters;
where v is a secret key of the checking entity;
where x and z are values transmitted in the first message and respectively satisfy the following equations:

$$x = g_1^{r_1} \cdot g_2^{r_2}$$

$$z = g_1^{v r'_1} \cdot g_2^{v r'_2}$$

where $y_1$ and $y_2$ are values transmitted in the second message and satisfy the respective equations:

$$y_1 = r_1 + s_1 c + r'_1$$

$$y_2 = r_2 + s_2 c + r'_2$$

where $s_1$ and $s_2$ are secret keys of the entity to be checked;
where r1, r2, r'1 and r'2 are random values generated in step /a/.

Here, advantageously, it is therefore possible to apply the present invention in the context of an Okamoto type protocol such as defined in the document 'Provably secure and practical identification schemes and corresponding signature schemes' by T. Okamoto dating from 1992.

Provision may alternatively be made for the value based on the second public parameter to be furthermore based on the random value and to be transmitted in the second message.

Here, it is advantageously possible to apply the present invention to the protocol of Fiat-Shamir type, such as defined in the document by Fiat and Shamir 'How to prove yourself: practical solutions of identification and signature problems', from Proceedings of Crypto 1986, and in the document 'A modification of the Fiat Shamir scheme' Proceedings of Crypto 1988.

In this context, it is possible to decide that the entity to be checked is checked on the basis of the following equation:

$$y^2 x^{-v} = J^c$$

where J is the public key of the entity to be checked or a value in a database accessible from the checking entity;
where y is the value (y) based on the second public parameter and satisfies the equation:

$$y = (g^v)^{r1} s^c$$

where $g^v$ is the second public parameter, r1 is the random value, s the secret key of the entity to be checked and c the value received from the checking entity;
where x is the value obtained in step /b/ and satisfies the equation:

$$x = g^{2r1}$$

where v is the secret key of the checking entity.

It is also advantageously possible to apply the present invention to the protocol of GQ type, such as defined in the document 'A paradoxical identity-based signature scheme resulting from Zero-Knowledge minimizing both transmission and memory' from Proceedings of Crypto 1988, by Guillou and Quisquater.

In this context, it is possible to decide that the entity to be checked is checked on the basis of the following equation:

$$y^{-W} x^v = J^c$$

where J is the public key of the entity to be checked or a value in a database accessible from the checking entity;
where y is the value (y) based on the second public parameter and satisfies the equation:

$$y = (g^v)^{r1} s^c$$

where s is a secret key of the entity to be checked;
where g is the first public parameter;
where $g^v$ is the second public parameter;
where $r_1$ is the random value;
where v is the secret key of the checking entity;
where x is the value obtained in step /b/ and satisfies the equation:

$$x = g^{Wr1}$$

where W is a public parameter associated with the entity to be checked.

In an embodiment of the present invention, it is possible to decide that the entity to be checked is checked on the basis of the following equation:

$$y^{-W} x^v = G_1^{d_1} \ldots G_m^{d_m}$$

where $G_1, G_2, \ldots, G_m$ and W are public keys of the entity to be checked or values in a database accessible from the checking entity, where m is a positive integer;
where x is the combined value transmitted in the first message and satisfies the equation:

$$x = g^{Wr1}$$

where y is the value based on the second public parameter and satisfies the equation:

$$y = (g^v)^{r1} Q_1^{d_1} \ldots Q_m^{d_m}$$

where g is the first public parameter;
where $g^v$ is the second public parameter;
where $r_1$ is the random value generated by the entity to be checked;
where v is the secret key of the checking entity;
where $Q_1, \ldots, Q_m$ are secret keys of the entity to be checked and satisfy the following equation:

$$G_i Q_i^W = 1, \text{ for } i \text{ lying between 1 and } m;$$

where $d_1, \ldots, d_m$ are random values generated by the checking entity.

Thus, it is possible to make provision to apply the present invention in the context of the GQ2 protocol or in the context of a protocol of Fiat-Shamir type with several secrets.

A second aspect of the present invention proposes a method of checking by a checking entity of at least one entity to be checked, a secret key being associated with the checking entity;
the entity to be checked and checking entity sharing a plurality of public parameters, a second public parameter of said plurality being a combination of a first public parameter of said plurality with the secret key of the checking entity;
said method comprising the following steps at the level of the checking entity:

/a/ receiving from the entity to be checked a first message comprising at least one combined value obtained on the basis of the first public parameter;

/b/ generating a random value and transmitting this random value to the entity to be checked;

/c/ receiving from the entity to be checked a second message comprising at least one combined value obtained on the basis of a random value generated at the level of the entity to be checked, of a secret key of the entity to be checked and of said random value generated in step /b/;

in which one of the values included in the first or the second message is based on the second public parameter.

By virtue of these arrangements, the same advantages are obtained as those listed above in regard to the checking method implemented according to an embodiment of the present invention at the level of the entity to be checked.

In an embodiment of the present invention, first and second random values are generated before step /a/ at the level of the entity to be checked; and
the value (z) based on the second public parameter ($g^v$) is furthermore based on the second random value and is received in the first message.

It is possible to decide that the entity to be checked is checked on the basis of the following equation:

$$J = ((g^v)^y x^{-v} z^{-1})^{1/vc}$$

where J is the public key of the entity to be checked or a value in a database accessible from the checking entity;
where g is the first public parameter;
$g^v$ is the second public parameter;
x is the combined value received in the first message;
y is the combined value received in the second message;
z is the value based on the second public parameter;
c is the value transmitted by the checking entity; and
v is the secret key of the checking entity.

Thus, an application of the present invention to the Schnorr type protocol is obtained.

Provision may also be made to bound the random values, the secret key of the entity to be checked, as well as the value received from the checking entity between 0 and respective defined values. Provision may be made for the first and second random values to lie between 0 and A−1; the value received from the checking entity to lie between 0 and B−1; and the secret key of the entity to be checked to lie between 0 and S−1; where A, B and S are public parameters. Under these conditions the entity to be checked can be checked furthermore on the basis of the following inequality:

$$0 \leq y \leq 2(A-1) + (B-1)(S-1)$$

It is possible to decide in another context that the entity to be checked is checked on the basis of the following equation:

$$J^{vc} = \frac{(g_1^v)^{y1} (g_2^v)^{y2}}{x^v z}$$

where J is the public key of the entity to be checked or a value in a database accessible from the checking entity;
where $g_1$ and $g_2$ are two first public parameters;
where $g_1^v$ and $g_2^v$ are two second public parameters;
where v is a secret key of the checking entity;
where x and z are values transmitted in the first message and respectively satisfy the following equations:

$$x = g_1^{r_1} \cdot g_2^{r_2}$$

$$z = g_1^{vr'_1} \cdot g_2^{vr'_2}$$

where $y_1$ and $y_2$ are values transmitted in the second message and satisfy the respective equations:

$$y_1 = r_1 + s_1 c + r'_1$$

$$y_2 = r_2 + s_2 c + r'_2$$

where $s_1$ and $s_2$ are secret keys of the entity to be checked;
where $r_1, r_2, r'_1$ and $r'_2$ are random values generated at the level of the entity to be checked before step /a/.

It is then possible to obtain a method of identification or authentication suited to an Okamoto type protocol.

Alternatively, the value (y) based on the second public parameter ($g^v$) can then furthermore be based on the random value and is transmitted in the second message.

It is thus possible to decide that the entity to be checked is checked on the basis of the following equation:

$$y^2 x^{-v} = J^c$$

where J is the public key of the entity to be checked or a value in a database accessible from the checking entity;
where y is the value (y) based on the second public parameter and satisfies the equation: $y = (g^v)^{r_1} s^c$
where $g^v$ is the second public parameter, r1 is the random value, s the secret key of the entity to be checked and c the value transmitted by the checking entity;
where x is the value obtained before step /a/ at the level of the entity to be checked and satisfies the equation:

$$x = g^{2r_1}$$

where v is the secret key of the checking entity.

A method according to an embodiment which is suited to the protocol of Fiat-Shamir type is then readily obtained here.

It is possible to decide in another context that the entity to be checked is checked on the basis of the following equation:

$$y^{-W} x^v = J^c$$

where J is the public key of the entity to be checked or a value in a database accessible from the checking entity;
where y is the value (y) based on the second public parameter and satisfies the equation:

$$y = (g^v)^{r_1} s^c$$

where s is a secret key of the entity to be checked;
where g is the first public parameter;
where $g^v$ is the second public parameter;
where r1 is the random value;
where v is the secret key of the checking entity;
where x is the value before step /a/ at the level of the entity to be checked and satisfies the equation:

$$x = g^{Wr_1}$$

where W is a public parameter associated with the entity to be checked.

It is then possible to obtain a method according to an embodiment of the present invention which is suited to the protocol of GQ type.

In an embodiment of the present invention, it is possible to decide that the entity to be checked is checked on the basis of the following equation:

$$y^{-W} x^v = G_1^{d_1} \ldots G_m^{d_m}$$

where $G_1, G_2, \ldots, G_m$ and W are public keys of the entity to be checked or values in a database accessible from the checking entity, where m is a positive integer;
where x is the combined value transmitted in the first message and satisfies the equation:

$$x = g^{Wr_1}$$

where y is the value based on the second public parameter and satisfies the equation:

$$y = (g^v)^{r_1} Q_1^{d_1} \ldots Q_m^{d_m}$$

where g is the first public parameter;
where $g^v$ is the second public parameter;
where $r_1$ is the random value generated by the entity to be checked;
where v is the secret key of the checking entity;
where $Q_1, \ldots, Q_m$ are secret keys of the entity to be checked and satisfy the following equation:

$$G_i Q_i^W = 1, \text{ for } i \text{ lying between 1 and } m;$$

where $d_1, \ldots, d_m$ are random values generated by the checking entity.

A third aspect of the present invention proposes an entity to be checked suitable for exchanging information with a checking entity, and suitable for implementing a checking method according to the first aspect of the present invention.

A fourth aspect of the present invention proposes a checking entity suitable for exchanging information with an entity to be checked, and suitable for implementing a checking method according to the second aspect of the present invention.

A fifth aspect of the present invention proposes a checking system comprising a checking entity according to the fourth aspect of the present invention and at least one entity to be checked according to the third aspect of the present invention.

Other aspects, aims and advantages of the invention will become apparent on reading the description of one of its embodiments.

BRIEF DESCRIPTION OF THE DRAWINGS

The invention will also be better understood with the aid of the drawings, in which.

DETAILED DESCRIPTION OF THE DISCLOSURE

The present invention is readily applied in various protocols such as in particular the Schnorr protocol, the Okamoto protocol, the GPS protocol, the Fiat-Shamir protocol, the GQ protocol, the GQ2 protocol defined in 'The new Guillou-Quisquater scheme'. RSA 2000 conference, as well as the Ong-Schnorr protocol such as defined in the document 'Fast signature generation with a Fiat Shamir like scheme' by H. Ong and C. Schnorr, Eurocrypt 1990.

Figure 1:
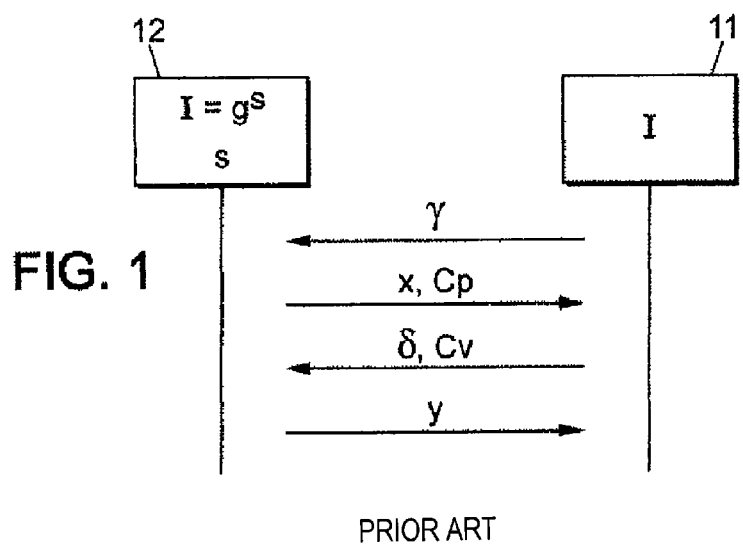
FIG. 1 illustrates a checking method according to an embodiment of the prior art.
Figure 2:
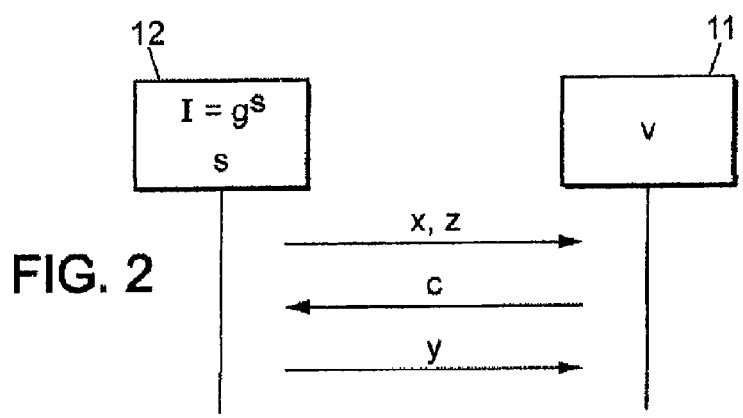
FIG. 2 illustrates a checking method according to an embodiment of the present invention.

FIG. 2 illustrates a checking method in an embodiment of the present invention. Here, a checking system contains a checking entity 11 and an entity to be checked 12.

No limitation is attached to the entity to be checked, nor to the number of entities to be checked that can be managed by the checking entity 11.

The present invention is readily applicable in an advantageous manner to an entity to be checked of electronic passport type or else an entity to be checked of RFID tag type.

The public parameters used in such a checking system are the following:
- g which represents the set of values in which the calculations are performed; and
- $g^v$, where v is a secret key associated with the checking entity 11.

The checking entity 11 is therefore furnished with a secret identifier v on the basis of which it is possible to guarantee confidentiality of the identity of the entity to be checked even in the case where the exchanges are listened to.

The entity to be checked 12 is likewise furnished with its secret identifier s. It furthermore uses a public key denoted I and which satisfies the equation:

$$I=g^s$$

Here, provision is made for the entity to be checked 12 to generate two random numbers r1 and r2.

Next, it transmits to the checking entity 11 a first and a second combined values which respectively satisfy the following equations:

$$x=g^{r1}, \text{ and}$$

$$z=(g^v)^{r2}$$

On receipt of these values, the checking entity 11 generates a random number c (or 'challenge') and transmits it to the entity to be checked 12.

The entity to be checked 12, on receipt of this value c, is then able to calculate a third combined value:

$$y=r1+sc+r2$$

This value y is thereafter dispatched to the checking entity 11.

On receipt of this value y, the checking entity is able to calculate a value J according to the following equation:

$$J=((g^v)^y x^{-v} z^{-1})^{1/vc}$$

Thus, the checking entity can advantageously at this juncture determine whether J corresponds to a value of public key I which is stored for example in a database associated with this checking entity. In this case, the checking entity can decide that the entity to be checked 12 has been identified.

In the case where the checking entity 11 knows the value of I, it can then verify that I satisfies the equation:

$$I=((g^v)^y x^{-v} z^{-1})^{1/vc}$$

and, in this case, decide that the entity to be checked has been authenticated.

Provision may be made for the value of I to be stored in a database, accessible from the checking entity, and to which it is possible to allow unrestricted access, since the knowledge of the identifiers I does not make it possible to recognize the identity of an entity to be checked, even though exchanges of this entity to be checked with a checking entity might have been listened to several times.

Such a checking method guarantees a high level of confidentiality which relies essentially on the secret attached to the secret key of the checking entity. Indeed, without this value v it is impossible to obtain information about the identification of the entity to be checked.

Now, it should be noted that, advantageously, in regard to the information exchanged, it is very complex to retrieve the secret key v.

The previous sections illustrate how a principle of the present invention can advantageously be applied in the context of a Schnorr type protocol.

The following sections detail an application of the present invention in the context of a protocol of GPS type.

Here, provision is made to bound the following values:
- r1 and r2 between 0 and A−1;
- c between 0 and B−1; and
- s between 0 and S−1;
- where A, B and S are parameters with the defined values.

In this context, the identity of the entity to be checked is checked on the basis of the following equation:

$$I=((g^v)^y x^{-v} z^{-1})^{1/vc}$$

as well as the following equation:

$$0 \leq y \leq 2(A-1)+(B-1)(S-1)$$

The following sections detail an application of the present invention in the context of a protocol of Okamoto type.

Here, provision is made to associate a first secret key s1 and a second secret key s2 with the entity to be checked.

The public parameters shared by the checking entity and the entity to be checked are $g_1$, $g_2$, $g_1^v$ and $g_2^v$, where v is the secret key of the checking entity.

A public key associated with the entity to be checked I satisfies the following equation:

$$I=g_1^{s1} g_2^{s2}$$

In this context, in step /a/, the four random values r1, r2, r'1 and r'2 are generated.

Next the entity to be checked 12 sends the checking entity 11 a first message which comprises the two values x and z defined respectively by the following equations:

$$x=g_1^{r1} \cdot g_2^{r2}$$

$$z=(g_1^v)^{r'1} \cdot (g_2^v)^{r'2}$$

On receipt of this first message, the checking entity generates a random value c and transmits it to the entity to be checked.

Next, this random value received from the checking entity is taken into account at the level of the entity to be checked so as to determine two values to be transmitted in a second message sent to the checking entity. These two values y1 and y2 satisfy the following equations:

$$y1=r1+s1 \cdot c+r'1$$

$$y2=r2+s2 \cdot c+r'2$$

Finally, on the basis of the values contained in this second message, the checking entity is able to check the checking entity, that is to say able to identify it or to authenticate it according to the following equation:

$$J^{vc} = \frac{(g_1^v)^{y1}(g_2^v)^{y2}}{x^v z}$$

More precisely, when the checking entity knows the value of the public key I of the entity to be checked, it checks whether the previous equation is satisfied, and in this case decides that the entity to be checked is authenticated.

In the case where the checking entity is furnished with a database of public keys of various entities to be checked, it verifies whether a value J of the database satisfies the previous equation, and if such is the case it decides that the entity to be checked is identified.

The following sections describe several applications of the present invention in the case where the combined value which is based on the second public parameter, that is to say the public parameter which arises from a combination with the secret key of the checking entity, is dispatched to the checking entity in the second message.

Figure 3:
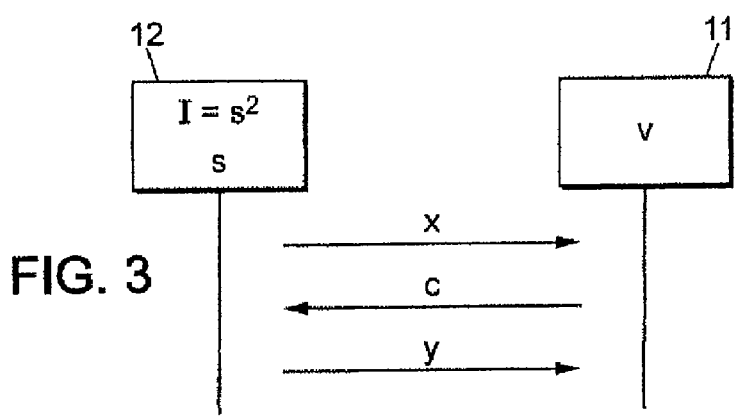
FIG. 3 illustrates a checking method according to another embodiment of the present invention.

FIG. 3 illustrates such an embodiment in which a first combined value x is initially dispatched from the entity to be checked 12 to the checking entity 11 in a first message, and in which a combined value y obtained on the basis of the shared public parameter arising from the secret key of the checking entity is dispatched later in a second message.

The following sections detail this type of application in the context of a protocol of Fiat-Shamir type.

Here again a secret key v is associated with the checking entity 11 and a public key I and a secret key s are associated with the entity to be checked 12.

The public key I and the secret key s of the entity to be checked are linked by the following equation:

$$I = s^2$$

A random value r1 is generated at the level of the entity to be checked. Next, a combined value x to be transmitted in the first message for the checking entity is obtained according to the following equation:

$$x = g^{2r1}$$

On receipt of this first message, the checking entity generates a random value c and transmits it to the entity to be checked, this value lying in the set of values 0 and 1.

Thereafter, the entity to be checked is capable of determining a combined value y to be transmitted via a second message to the checking entity according to the following equation:

$$y = (g^v)^{r1} s^c$$

Here, the checking entity can decide whether the entity to be checked is or is not checked. Indeed, if the checking entity knows the public key of the entity to be checked, it is able to decide that the latter is authenticated if the following equation is satisfied:

$$I^c = y^2 x^{-v}$$

If it is furnished only with a database of public keys, it can decide that the entity to be checked is identified if there exists a value J in the database satisfying the equation:

$$J^c = y^2 x^{-v}$$

Generally, the exchanges described in various contexts of application can advantageously be repeated so as to be able to increase the reliability of an identification or authentication decision. It should be noted that it is preferable to operate thus by repetition in the context of application to a protocol of Fiat-Shamir type.

The following sections detail an application of the present invention in the context of a protocol of GQ type.

A secret key v is associated with the checking entity 11. Two public keys I and W are associated with the entity to be checked 12, as well as a secret key s, the following equation being satisfied:

$$s^W I = 1$$

The public parameters g and $g^v$ are shared by the checking entity and the entity to be checked, v being the secret key of the checking entity.

A random value r1 is generated at the level of the entity to be checked. Next, a first message is transmitted to the checking entity, this first message comprising a value x satisfying the following equation:

$$x = g^{Wr1}$$

On receipt of this first message, the checking entity generates a random value c and transmits it to the entity to be checked, this value lying between 0 and W−1.

The latter is then able to determine a value y obtained on the basis of the public parameter $g^v$ according to the following equation:

$$y = (g^v)^{r1} s^c$$

Thereafter this value y is transmitted in a second message to the checking entity.

The latter can then check the entity to be checked.

If it knows the public keys I and W of the entity to be checked, and if the following equation is satisfied:

$$I^c = y^{-W} x^v$$

then the entity to be checked is authenticated.

If the checking entity is furnished with a database comprising a list of public keys then it can decide that the entity to be checked is identified if a value J of the database satisfies the following equation:

$$J^c = y^{-W} x^v$$

The following sections detail an application of the present invention in the context of a protocol of GQ2 type.

The public parameters g and $g^v$ are shared by the checking entity and the entity to be checked, v being the secret key of the checking entity.

A plurality of public keys are associated with the entity to be checked $G_1, \ldots, G_m$ and W, where m is a positive integer.

A plurality of secret keys are also associated with the entity to be checked $Q_1, \ldots, Q_m$, these secret keys satisfying the following equation:

$$G_i Q_i^W = 1, \text{ for } i \text{ lying between 1 and } m.$$

The entity to be checked generates a random value $r_1$ and transmits a first message to the checking entity, this first message comprising the value x defined as follows:

$$x = g^{Wr1}$$

On receipt of this first message, the checking entity generates a plurality of random values $d_1, \ldots, d_m$, each lying between 0 and W−1.

Thereafter, the entity to be checked transmits in a second message the value y such as defined hereinafter:

$$y = (g^v)^{r1} Q_1^{d1} \ldots Q_m^{dm}$$

On receipt of this second message, the checking entity is then able to check the entity to be checked. If it knows all the public keys of the entity to be checked, it can authenticate it if the following equation is satisfied:

$$y^{-W} x^v = G_1^{d1} \ldots G_m^{dm}$$

In all the cases described above, it should be noted that it can be advantageous to make provision to exchange the public parameter $g^v$ beforehand before any other exchange of message according to the method of an embodiment of the present invention. In this case, provision may be made for the entity to be checked to verify the validity of this public parameter by a certification or signature procedure. Such an embodiment then makes it possible to easily modify this parameter and to thus increase the level of protection and the interoperability of such a protocol under certain conditions.

What is claimed is:

1. A method of checking an entity to be checked by a checking entity where the first entity to be checked comprises a first electronic chip and the checking entity comprises a second electronic chip;
   a secret key being associated with the checking entity and stored at the second electronic chip;
   said entity to be checked and said checking entity sharing a plurality of public parameters, a second public parameter of said plurality being a combination of a first public parameter of said plurality with the secret key of the checking entity;
   said method comprising the following steps in the entity to be checked:
   /a/ generating first and second random values and storing the first and second random values at the first electronic chip, in which at least one of the values based on the second public parameter is furthermore based on the second random value and is transmitted in the first message;
   /b/ transmitting a first message to the checking entity, said first message comprising at least one combined value obtained by combining the first public parameter with the at least one random value; and
   /c/ transmitting a second message to the checking entity, said second message comprising at least one combined value obtained by combining the at least one random value, a secret key of the entity to be checked and a value received from the checking entity;
   in which at least one of the values included in the first or the second message is based on the second public parameter; and
   in which it is decided that the entity to be checked is checked on the basis of the following equation:

$$J = ((g^v)^y x^{-v} z^{-1})^{1/vc}$$

where J is a public key of the entity to be checked or a value in a database accessible from the checking entity;
   where g is the first public parameter;
   where $g^v$ is the second public parameter;
   where x is a combined value transmitted in the first message;
   where y a combined value transmitted in the second message;
   where z is the value based on the second public parameter;
   where c is the value received from the checking entity; and
   where v is the secret key of the checking entity.

2. The checking method as claimed in claim 1, in which a first combined value is obtained by calculating the first public parameter to the power of the first random value and a second combined value is obtained by calculating the second public parameter to the power of the second random value, and
   in which a third combined value is obtained by summing the following values:
   the first random value,
   the second random value, and
   the product of the secret key of the entity to be checked with the value received from the checking entity.

3. The checking method as claimed in claim 1, in which the first and second random values lie between 0 and A−1; the value received from the checking entity lies between 0 and B−1; and the secret key of the entity to be checked lies between 0 and S−1; where A, B and S are public parameters; and
   in which the entity to be checked is checked furthermore on the basis of the following inequality:

$$0 \leq y \leq 2(A-1)+(B-1)(S-1).$$

4. The checking method as claimed in claim 1, in which it is decided that the entity to be checked is checked on the basis of the following equation:

$$J^{vc} = \frac{(g_1^v)^{y1}(g_2^v)^{y2}}{x^v z}$$

where J is a public key of the entity to be checked or a value in a database accessible from the checking entity;
   where $g_1$ and $g_2$ are two first public parameters;
   where $g_1^v$ and $g_2^v$ are two second public parameters;
   where v is a secret key of the checking entity;
   where x and z are values transmitted in the first message and respectively satisfy the following equations:

$$x = g_1^{r_1} \cdot g_2^{r_2}$$

$$z = g_1^{v r'_1} \cdot g_2^{v r'_2}$$

where y1 and y2 are values transmitted in the second message and satisfy the respective equations:

$$y1 = r_1 + s_1 c + r'_1$$

$$y2 = r_2 + s_2 c + r'_2$$

where $s_1$ and $s_2$ are secret keys of the entity to be checked;
   where $r_1, r_2, r'_1$ and $r'_2$ are random values generated in step /a/.

5. The checking method as claimed in claim 1, in which the at least one of the values, based on the second public parameter, is furthermore based on the at least one random value and is transmitted in the second message.

6. The checking method as claimed in claim 5, in which it is decided that the entity to be checked is checked on the basis of the following equation:

$$y^2 x^{-v} = J^c$$

where J is a public key of the entity to be checked or a value in a database accessible from the checking entity;
   where y is a value based on the second public parameter and satisfies the equation:

$$y = (g^v)^{r1} s^c$$

where $g^v$ is the second public parameter, r1 is a random value, s is a secret key of the entity to be checked, and c is the value received from the checking entity;
   where x is the at least one combined value obtained in step /b/ and satisfies the equation:

$$x = g^{2r1}$$

where v is the secret key of the checking entity.

7. The checking method as claimed in claim 5, in which it is decided that the entity to be checked is checked on the basis of the following equation:

$$y^{-w} x^v = J^c$$

where J is a public key of the entity to be checked or a value in a database accessible from the checking entity;
   where y is a value based on the second public parameter and satisfies the equation:

$$y = (g^v)^{r1} s^c$$

where s is the secret key of the entity to be checked;
where g is the first public parameter;
where $g^v$ is the second public parameter where r1 is a random value;
where v is the secret key of the checking entity;
where x is the at least one combined value obtained in step /b/ and satisfies the equation:

$$x = g^{Wr1}$$

where W is a public parameter associated with the entity to be checked.

8. The checking method as claimed in claim 5, in which it is decided that the entity to be checked is checked on the basis of the following equation:

$$y^{-W} x^v = G_1^{d_1} \ldots G_m^{d_m}$$

where $G_1, G_2, \ldots, G_m$ and W are public keys of the entity to be checked or values in a database accessible from the checking entity, where m is a positive integer;
where x is the at least one combined value transmitted in the first message and satisfies the equation:

$$x = g^{Wr1}$$

where y is a value based on the second public parameter and satisfies the equation:

$$y = (g^v)^{r1} Q_1^{d_1} \ldots Q_m^{d_m}$$

where g is the first public parameter;
where $g^v$ is the second public parameter where r1 is a random value generated by the entity to be checked;
where v is the secret key of the checking entity;
where $Q_1, \ldots, Q_m$ are secret keys of the entity to be checked and satisfy the following equation:

$$G_i Q_i^W = 1, \text{ for } i \text{ lying between 1 and } m;$$

where $d_1, \ldots, d_m$ are random values generated by the checking entity.

9. An entity to be checked suitable for exchanging information with a checking entity, and suitable for implementing a checking method as claimed in claim 1.

10. A checking system comprising a checking entity as claimed in claim 9 and at least one entity to be checked.

11. A method of checking by a checking entity an entity to be checked,
a secret key being associated with the checking entity, the secret key stored on a first electronic chip of the checking entity;
said entity to be checked and said checking entity sharing a plurality of public parameters, a second public parameter of said plurality being a combination of a first public parameter of said plurality with the secret key of the checking entity;
said method comprising the following steps in the checking entity:
/a/ receiving from the entity to be checked a first message comprising at least one combined value obtained on the basis of the first public parameter;
/b/ generating a random value and transmitting the random value to the entity to be checked;
/c/ receiving from the entity to be checked a second message comprising at least one combined value obtained on the basis of a random value generated at the level of the entity to be checked, of a secret key of the entity to be checked, the secret key of the entity to be checked stored at a second electronic chip of the entity to be checked and of said random value generated in step /b/;

in which one of the values included in the first or the second message is based on the second public parameter and
in which first and second random values are generated at the level of the entity to be checked before step /a/; and
in which the value based on the second public parameter is furthermore based on the second random value and is received in the first message; and
in which it is decided that the entity to be checked is checked on the basis of the following equation:

$$J = ((g^v)^y x^{-v} z^{-1})^{1/vc}$$

where J is a public key of the entity to be checked or a value in a database accessible from the checking entity;
where g is the first public parameter;
$g^v$ is the second public parameter;
x is a combined value transmitted in the first message;
y is a combined value transmitted in the second message;
z is the value based on the second public parameter;
c is the value transmitted by the checking entity; and
v is the secret key of the checking entity.

12. The checking method as claimed in claim 11, in which the first and second random values lie between 0 and A−1; the value received from the checking entity lies between 0 and B−1; and the secret key of the entity to be checked lies between 0 and S−1; where A, B and S are public parameters; and
in which the entity to be checked is checked furthermore on the basis of the following inequality:

$$0 \leq y \leq 2(A-1) + (B-1)(S-1).$$

13. The checking method as claimed in claim 11, in which it is decided that the entity to be checked is checked on the basis of the following equation:

$$J^{vc} = \frac{(g_1^v)^{y1} (g_2^v)^{y2}}{x^v z}$$

where J is a public key of the entity to be checked or a value in a database accessible from the checking entity;
where $g_1$ and $g_2$ are two first public parameters
where $g_1^v$ and $g_2^v$ are two second public parameters;
where v is a secret key of the checking entity;
where x and z are values transmitted in the first message and respectively satisfy the following equations:

$$x = g_1^{r1} \cdot g_2^{r2}$$

$$z = g_1^{vr'1} \cdot g_2^{vr'2}$$

where y1 and y2 are values transmitted in the second message and satisfy the respective equations:

$$y_1 = r_1 + s_1 c + r'_1$$

$$y_2 = r_2 + s_2 c + r'_2$$

where $s_1$ and $s_2$ are secret keys of the entity to be checked;
where $r_1, r_2, r'_1$ and $r'_2$ are random values generated at the level of the entity to be checked before step /a/.

14. The checking method as claimed in claim 11, in which the value based on the second public parameter is furthermore based on the random value and is transmitted in the second message.

15. The checking method as claimed in claim 14, in which it is decided that the entity to be checked is checked on the basis of the following equation:

$$y^2 x^{-v} = J^c$$

where J is a public key of the entity to be checked or a value in a database accessible from the checking entity;

where y is the value based on the second public parameter and satisfies the equation:

$$y=(g^v)^{r1}s^c$$

where $g^v$ is the second public parameter, r1 is the random value, s is the secret key of the entity to be checked and c is the random value transmitted by the checking entity;

where x is the at least one value obtained before step /a/ at the level of the entity to be checked and satisfies the equation:

$$x=g^{2r1}$$

where v is the secret key of the checking entity.

16. The checking method as claimed in claim 14, in which it is decided that the entity to be checked is checked on the basis of the following equation:

$$y^{-W}x^v=J^c$$

where J is a public key of the entity to be checked or a value in a database accessible from the checking entity;

where y is the value based on the second public parameter and satisfies the equation:

$$y=(g^v)^{r1}s^c$$

where s is the secret key of the entity to be checked;
where g is the first public parameter;
where $g^v$ is the second public parameter;
where r1 is the random value;
where v is the secret key of the checking entity;
where x is the at least one combined value obtained before step /a/ at the level of the entity to be checked and satisfies the equation:

$$x=g^{Wr1}$$

where W is a public parameter associated with the entity to be checked.

17. The checking method as claimed in claim 14, in which it is decided that the entity to be checked is checked on the basis of the following equation:

$$y^{-W}x^v=G_1^{d1}\ldots G_m^{dm}$$

where $G_1, G_2, \ldots, G_m$ and W are public keys of the entity to be checked or values in a database accessible from the checking entity, where m is a positive integer;

where x is a combined value transmitted in the first message and satisfies the equation:

$$x=g^{Wr1}$$

where y is the value based on the second public parameter and satisfies the equation:

$$y=(g^v)^{r1}Q_1^{d1}\ldots Q_m^{dm}$$

where g is the first public parameter;
where $g^v$ is the second public parameter
where r1 is the random value generated by the entity to be checked;
where v is the secret key of the checking entity;
where $Q_1, \ldots, Q_m$ are secret keys of the entity to be checked and satisfy the following equation:

$$G_iQ_i^W=1, \text{ for } i \text{ lying between 1 and } m;$$

where $d_1, \ldots, d_m$ are random values generated by the checking entity.

18. A checking entity suitable for exchanging information with an entity to be checked, and suitable for implementing a checking method as claimed in claim 11.

\* \* \* \* \*